March 8, 1966    A. B. SKROMME ET AL    3,239,279
SILO UNLOADER

Filed Sept. 11, 1964    3 Sheets-Sheet 1

*INVENTORS*
A.B. SKROMME  S. K. OCHSNER
D. E. BOWMAN  J. E. HOFFMAN, Jr.
BY
William A. Murray
ATTORNEY

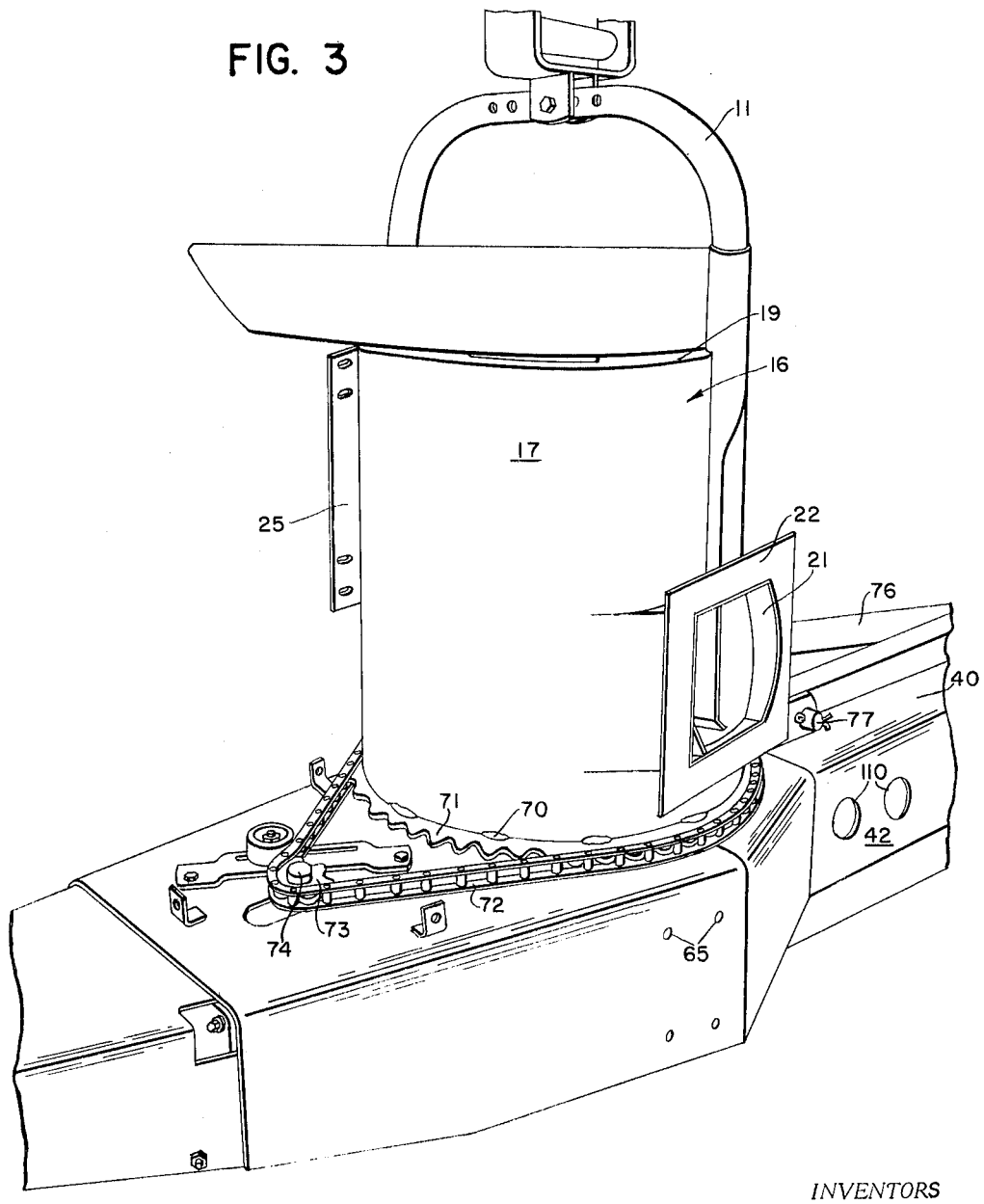

March 8, 1966  A. B. SKROMME ETAL  3,239,279
SILO UNLOADER

Filed Sept. 11, 1964  3 Sheets-Sheet 3

*INVENTORS*
A. B. SKROMME  S. K. OCHSNER
D. E. BOWMAN  J. E. HOFFMAN, Jr.
BY William A. Murray

ATTORNEY

United States Patent Office 3,239,279
Patented Mar. 8, 1966

3,239,279
SILO UNLOADER
Arnold B. Skromme, Stanley K. Ochsner, Dennis E. Bowman, and John E. Hoffman, Jr., all of Moline, Ill., assignors to Deere & Company, Moline, Ill., a corporation of Delaware
Filed Sept. 11, 1964, Ser. No. 395,663
9 Claims. (Cl. 302—56)

This invention relates to a silo unloader and more particularly to the means of discharging silage from the top or upper surface of silage contained within a silo. In U.S. patent application Serial No. 165,394, filed January 10, 1962, now Patent No. 3,144,144, there is shown and described a new and novel method of removing the top layer of silage and moving it centrally to the center of a silo to a material receiving chamber. Contained within the chamber is a vertical impeller member driving the silage through an outlet in the side of the chamber and into the path of an auger discharge conveyor. The auger discharge conveyor moves the material outwardly through the side opening in the silo wall.

It is the main object of the present invention to improve on the method of discharge from the chamber through the side opening in the silo. More specifically, it is the object of the invention to provide an impeller assembly with an impeller or blower housing formed about a horizontal axis and having oppositely disposed upright side walls, with the inner of the side walls being disposed alongside the chamber and having a blower inlet in registry with the material discharge in the side of the chamber.

It is a further object of the invention to provide with the blower or impeller housing a unique type of blade having recessed portions adjacent the aforementioned inner wall to permit silage to be impelled within the blower housing by the impeller blades contained within the chamber.

It is still a further object of the invention to provide structure permitting the entire blower housing to be easily removed from the chamber housing so as to permit the material outlet of the chamber and the material inlet of the blower to be used as access areas for the respective impeller chamber and blower housing.

It is still a further object of the invention to provide with the aforementioned type of silo unloader, a housing structure substantially closing the sweep auger and having air openings in the panels defining the sides and the top permitting air to pass into the blower to further aid in moving the material into the blower.

Other objects and advantages of the present invention will become apparent to those skilled in the art as the nature of the invention is better understood from the following description and as shown in the accompanying drawings.

FIG. 3 is a perspective and enlarged view of the central portion of the silo unloader with portions thereof removed.

Figure 1:
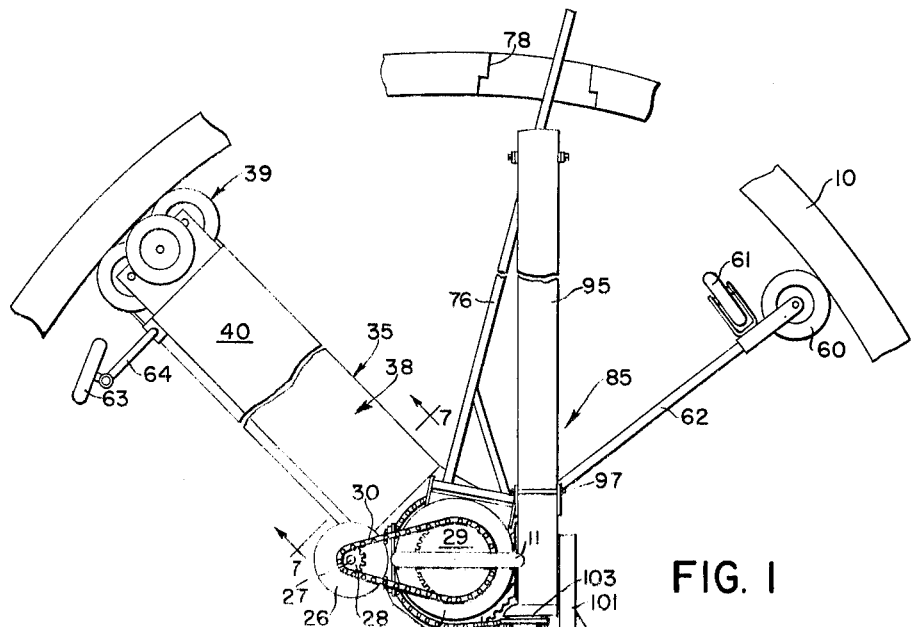
FIG. 1 is a plan view of a silo unloader incorporating the principles of the present invention and showing portions of the silo wall.
Figure 2:
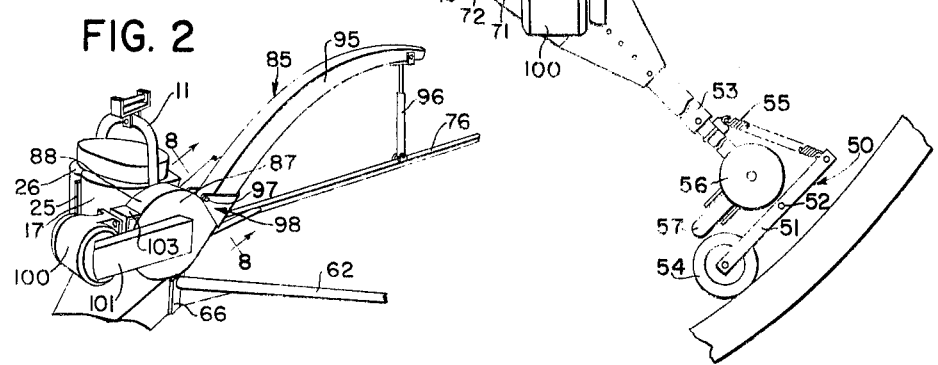
FIG. 2 is a side perspective view of a major portion of the silo unloader shown in FIG. 1.

The silo unloader is of the type disposed on the surface of the silage and adapted to move over the surface and remove a top layer of silage. Such a silo unloader is normally supported from the top of the silo by a cable, not shown, connected to a U-shaped main frame 11 directed downwardly and having opposite leg portions fixed to an inverted cup-shaped impeller chamber or casing 16 with a vertically disposed cylindrical casing wall 17. The casing 16 is closed at its upper end by a horizontally disposed wall 19 and has an intermediate panel or false bottom 20 offering support to the chamber walls midway between the upper and lower ends. The panel 20 also defines the upper limits of the material chamber in the lower half of the chamber 16. The chamber 16 has a material discharge outlet 21 in one side of the chamber wall 17 defined by a relatively short horizontal duct portion extending outwardly from the wall 17 and having a vertically disposed rectangular-shaped plate 22 circumscribing its outer limits. The casing wall 17 also has a lower horizontally disposed annular edge 18.

The housing wall 17 has affixed thereto a motor-supporting bracket structure 25 supporting a vertically disposed electric motor 26 having a vertical motor shaft 27 projecting upwardly therefrom and carrying a chain sprocket 28. The sprocket 28 is connected to a driven sprocket 29 by a chain 30. The sprocket 29 is centrally located relative to the chamber walls 17 and is journaled to the upper horizontal wall 19 and the mid-positioned horizontal wall 20 by bearing members shown partially and indicated by reference numerals 31, 32 respectively. The shaft 33 is the main drive shaft of the entire silo unloader.

The upper end of the shaft 33 is splinded to receive the sprocket 29 and extends downwardly through the center of the housing 16 to a lower end drivingly connected through a gear transmission, indicated in its entirety by the reference numeral 34, to a horizontal sweep conveyor, indicated in its entirely by the reference numeral 35. The sweep conveyor 35 extends diametrically across the silo and includes an auger 36 geared within the housing 34 to rotate with the vertical shaft 33. The auger 36 extends radially to an outer end closely adjacent the wall 10. At the outer end of the auger 36, and connected to the auger housing 38 adjacent the wall 10, is a leveling system 39 engaging the wall. The outer end of the auger 36 rides closely adjacent the wall to provide a radial sweep extending from the center of the silo to the wall. The auger housing 38 includes an overhead panel 40, a side panel 41 in advance of the auger 36, and a side panel 42 in trailing relation to the auger 36. Gusset plates, at 43, 44, interconnect the vertical side walls 41, 42 and the horizontal wall 40 and described air ducts with the respective walls.

The housing 38 extends beneath the chamber 16 and has in the overhead panel 40 directly beneath the chamber 16 a material opening 45 permitting material or silage to move vertically from the auger 36 into the chamber 16. Affixed to the inner end of the auger 36 and adapted to rotate therewith is a flipper blade 46. As material is moved inwardly by the auger 36, it contacts the flipper blade 46 and is driven upwardly through the opening 45 into the interior of the chamber 16.

The housing 38 extends beyond the center of the silo and has on the end opposite of the leveling wheels 39 a pressure device, indicated in its entirety by the reference numeral 50. The device 50 includes a horizontal arm 51 pivoted at 52 to a telescoping type extension 53 projecting from the outer end of the housing 38. The arm carries at one end and in a trailing relation to the pivot 52 a wall-engaging wheel 54, and is connected at its opposite end, by means of a spring 55, to the telescoping arm portion 53. Consequently, there is maintained a pressure between the wheel 54 and the wall 10. A weight 56 and gauge wheel 57 is provided at the end of the sweep conveyor 35.

A guide wheel assembly including a horizontal wheel 60, engaging the wall 10, and a gauge wheel 61, engaging the top of the silage surface, is carried on a radial arm 62 fixed to the side of the housing 35 and projecting therefrom substantially at 90° from the sweep structure 35. A third gauge wheel 63 is carried by an arm 64 in advanced relation to the sweep structure 35 adjacent the leveling wheel device 39. The arm 62 is carried on the center portion of the sweep auger housing structure 38, holes, such as is shown at 65, being provided to mount a supporting plate 66 thereto.

Welded, as at 70, to the outer surface of the cylindrical wall 17 is a sprocket 71 drivingly connected by a chain 72 to a drive sprocket 73 supported on a short vertical shaft 74. The shaft 74 is driven through a gear transmission mechanism, indicated by the reference numeral 75, fixed to the underside of the overhead panel structure 40 and is drivingly connected to the lower end of the shaft 33, a suitable gear mechanism, not shown, being provided within the gear transmission 34. In operation, as the sprocket 73 is driven, the chain 72 is forced to track around the sprocket 71 to thereby drive the entire sweep mechanism 35 over the surface of the silage. The chamber 16 is held against angular movement by a radial arm structure 76 pivoted for vertical movement on pivot pin 77 and extending outwardly through a side opening 78 in the silo wall 10.

Fixed to rotate with the shaft 33 and within the chamber 16 is an impeller having impeller blades 80 disposed substantially opposite the opening 21 in the chamber wall 17. The blades 80 are vertically disposed and rotate about the vertical axis of the shaft 33. In operation, as material is moved vertically by the flipper blades 46, the material contacts the impeller blades 80 and is driven outwardly through the opening 21.

It should be recognized that many of the features of the present structure have been set forth only generally and not in detail. Somewhat similar features are shown in present pending applications of Raymond S. Wilkes, Serial No. 351,100 and Sylvan H. Sime, Serial No. 165,394, now Patent No. 3,144,144. If more detail of the present structure should be required, reference may be made to those applications. However, it is believed that the present disclosure is sufficient for purposes of explaining the combinative structure of the present invention.

Figures 5, 6:
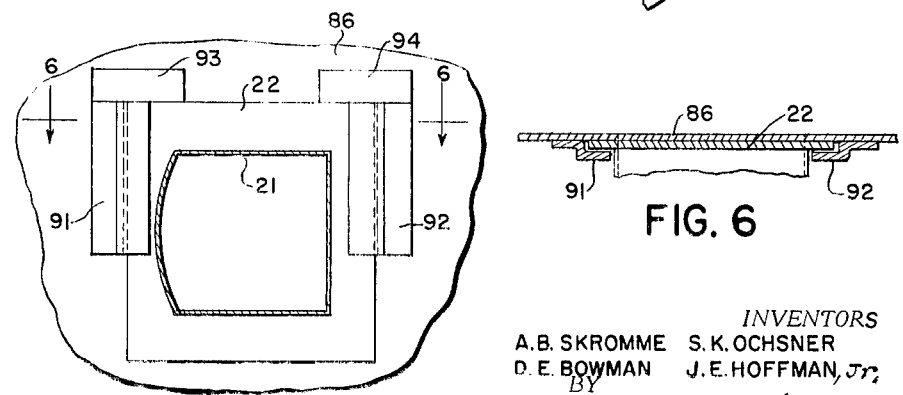
FIG. 5 is a sectional view taken substantially along the line 5—5 of FIG. 4.
FIG. 6 is a sectional view taken substantially along the line 6—6 of FIG. 5.
Figure 7:
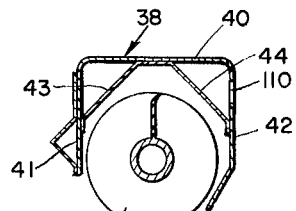
FIG. 7 is a sectional view taken substantially along the line 7—7 of FIG. 1.
Figure 4:
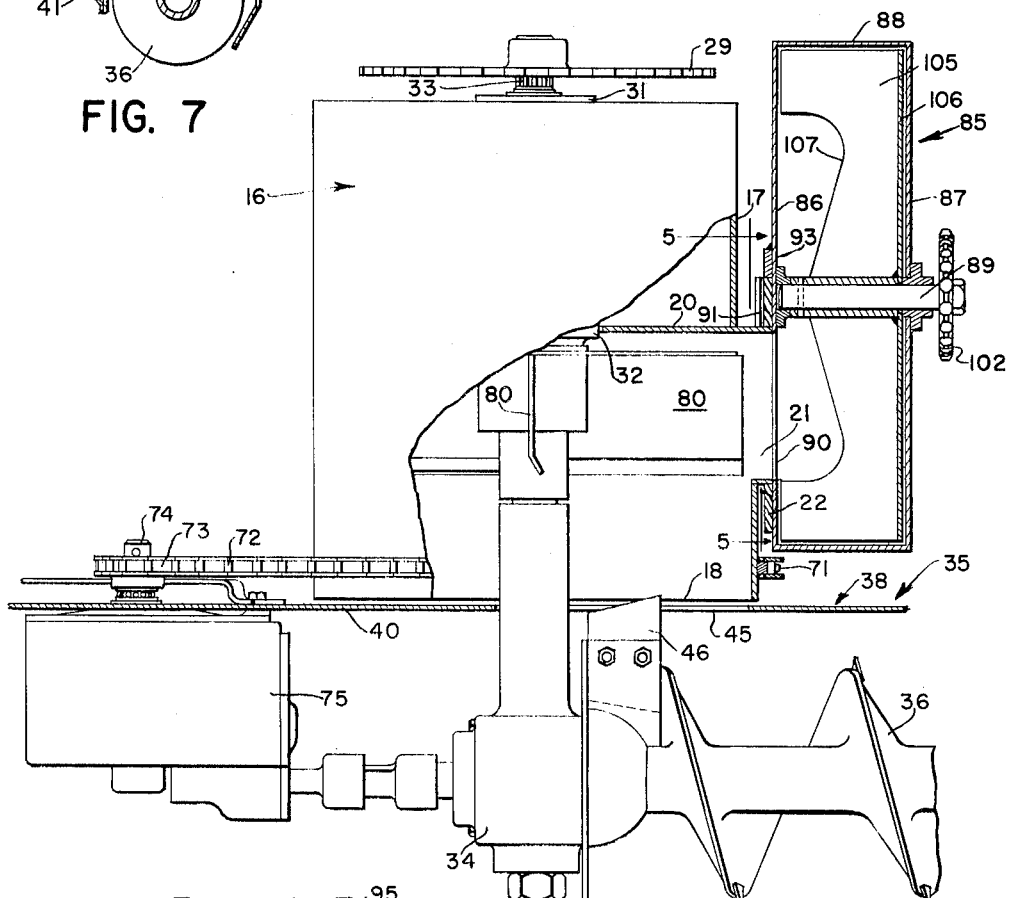
FIG. 4 is an enlarged view of the central portion of the silo unloader with portions thereof shown in section to indicate the internal operating mechanism of the silo unloader.
Figure 8:
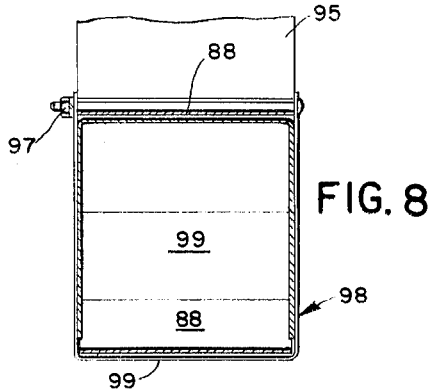
FIG. 8 is a sectional view taken substantially along the line 8—8 of FIG. 2.

A blower mechanism, indicated in its entirety by the reference numeral 85, is provided alongside the chamber 16 and includes a blower housing having oppositely disposed inner and outer upright sides 86, 87 interconnected by an annular scroll-shaped panel 88 having a material discharge, not shown, but in the conventional location for such a blower. The panel 88 is formed about a horizontal axis of a horizontal blower shaft 89. The inner panel 86 has a material inlet 90 normally in registry with the discharge opening 21 of the chamber 16 and disposed beneath the axis of the shaft 89. Adjacent the opening 90 is a pair of vertical tracks 91, 92 adapted to fit behind the vertical edges of the plate 22 to permit vertical movement of the entire blower relative to the plate as well as the entire chamber 16. A pair of abutment brackets 93, 94 is provided on the face of the panel 86 and is positioned to engage the upper edge of the plate 22 when the opening 90 is in registry with the opening 21. As may be seen from viewing FIGS. 4–6, the entire blower assembly may be removed from the chamber 16 merely by raising the unit from the plate 22. It may also be recognized that access to the chamber 16 and to the blower housing may occur by removal of the housing from the chamber. This becomes particularly important should the units become clogged for any reason. Except for the material inlet 90 and the material outlet on the blower housing, the entire housing is substantially imperforate.

The blower housing has a material discharge chute or duct 95 directed toward the side opening 78 in the silo wall 10. The outermost end of the chute 95 is supported on an upright rod structure 96 carried at its lower end on the arm structure 76. Since the arm structure 76 pivots vertically and extends through the opening 78, as the silo unloader drops, due to removal of several of the layers of silage, there is a self-adjustment of the chute 95 so as to always direct it toward the opening 78. The chute 95 is pivotally mounted at 97 to the blower housing so as to permit vertical adjustment in the manner described. Adjacent the discharge opening of the blower housing, the chute has a U-shaped supporting bracket 98 with the bight portion 99 underlying the chute 95. The bight portion 99 of the U-shaped bracket generally serves to prevent material from dropping out of the blower housing until it has sufficient opportunity to move into the discharge chute 95.

The blower drive shaft 89 is driven by a separate electric motor 100 through a chain and sprocket drive contained under a chain drive housing 101 and including a sprocket 102 affixed directly to the shaft 89. The blower housing has supporting brackets 103 carrying the motor 100.

In operation, it should be understood the impeller blade 80 as well as the flipper blade 46 is driven by a main shaft 33 at a relatively low rate of speed. The chain drive between the motor 26 and the upright shaft 33 has a large speed reduction and consequently the sweep auger as well as all portions operatively associated with the shaft 33 move at low velocity. However, the blower drive shaft 89 moves at a relatively high rate of speed and is driven directly by the motor 100 at substantially the rate of rotation of the motor shaft.

Contained within the blower housing is a series of blower blades 105 having an upright disk or plate 106 supported on the shaft 89 closely adjacent the housing panel 87. The inner edges of the blades 105 are recessed, as shown at 107, to permit material to move through the opening 21 and inlet 90 without direct contact with the blades 105 until the material is within the blower housing.

In operation, the blower blades 105 drives material outwardly into the chute 95 and through the side opening 78 of the silo walls 10. The blower housing being substantially closed except for the material inlet 90 and the discharge outlet creates a vacuum at the inlet 90 effective to draw or suck material from within the chamber 16 directly into the blower. Therefore, the impeller blades 80 as well as the flipper 46 may move at a relatively low rate of speed to impel the material. In order to provide a desirable movement or path of air in respect to the chamber 16 and the inner end of the sweep conveyor, there is provided in the trailing upright wall 42 a series of air openings 110 that permits the air to move into the downwardly opening housing 38 directly adjacent the inner end of the sweep auger 36 and the flipper blade 46. This creates a path or a stream of air moving into the chamber 16 and aids the material to move into the blower 85.

While only one form of the invention has been shown, it is recognized that other forms and variations will occur to those skilled in the art. Therefore, while the preferred form has been shown in concise and detailed manner for the purpose of clearly and concisely illustrating the principles of the invention, it should be understood there is no intention to limit or narrow the invention beyond the broad concepts set forth in the appended claims.

What is claimed is:

1. A silo unloader for use in a silo having an upright silo wall with a side opening therein comprising: a downwardly opening impeller chamber with a side discharge opening; a vertically disposed drive shaft extending through the chamber with a lower end beneath the chamber; a sweep conveyor drivingly connected to the lower end of the shaft and extending from an inner end adjacent the shaft to an outer end adjacent the wall a flipper blade adjacent the inner end of the conveyor adapted to drive material upwardly from the inner end of the conveyor; impeller blade means in the chamber fixed on the shaft to rotate about its upright axis and to drive material outwardly through the side discharge opening; a blower assembly including a blower housing formed about a horizontal axis and having opposite upright side walls with an inner of the side walls being disposed alongside the chamber and having a material receiving inlet beneath the aforesaid axis and in registry with the material discharge outlet, the blower assembly further having a material discharge chute for guiding material from the housing through the side opening of the silo wall, and blade means carried on the housing to rotate about the axis; and drive means for rotating the shaft and blade means within the housing.

2. A silo unloader for use in a silo having an upright silo wall with a side opening therein comprising: a downwardly opening impeller chamber with a side discharge opening; a vertically disposed drive shaft extending through the chamber with a lower end beneath the chamber; a sweep conveyor including a laterally disposed auger drivingly connected to the lower end of the shaft and extending from an inner end beneath the chamber and adjacent the shaft to an outer end adjacent the wall and having a flipper blade adjacent its inner end adapted to drive material upwardly from the inner end; impeller blade means in the chamber fixed on the shaft to rotate about its upright axis and to drive material outwardly through the side discharge opening; a blower assembly including a blower housing formed about a horizontal axis and having opposite upright side walls with an inner of the side walls being disposed alongside the chamber and having a material receiving inlet beneath the aforesaid axis and in registry with the material discharge outlet, the blower assembly further having a material discharge chute for guiding material from the housing through the side opening of the silo wall, and blade means carried on the housing to rotate about the axis; and drive means for rotating the shaft and blade means within the housing.

3. A silo unloader for use in a silo having an upright silo wall with a side opening therein comprising: a downwardly opening impeller chamber with a side discharge opening; a vertically disposed drive shaft extending through the chamber with a lower end beneath the chamber; a sweep conveyor including a laterally disposed auger drivingly connected to the lower end of the shaft and extending from an inner end beneath the chamber and adjacent the shaft to an outer end adjacent the wall and having a flipper blade adjacent its inner end adapted to drive material upwardly from the inner end; impeller blade means in the chamber fixed on the shaft to rotate about its upright axis and to drive material outwardly through the side discharge opening; a blower assembly including a blower housing formed about a horizontal axis and having an annular outer wall with a blower discharge therein and opposite upright side walls with an inner of the side walls being disposed alongside the chamber and having a material receiving inlet beneath the aforesaid axis and in registry with the material discharge outlet, the housing being substantially closed except for the inlet and discharge, the blower assembly further having a material discharge chute for guiding material from the blower discharge through the side opening of the silo wall, and blade means carried on the housing to rotate about the axis; a first drive means for rotating the shaft at a low rate of speed whereby the impeller blade means and flipper rotate at relatively low rates and material is moved predominantly by impact therewith and negligibly by movement of air; and a second drive means effecting rotation of the blower blade means at a high rate for blowing and impelling material from the blower housing and effecting a suction at the inlet for drawing material therethrough.

4. A silo unloader for use in a silo having an upright silo wall with a side opening therein comprising: a downwardly opening impeller chamber with a side discharge opening; a vertically disposed drive shaft extending through the chamber with a lower end beneath the chamber; a sweep conveyor drivingly connected to the lower end of the shaft and extending from an inner end adjacent the shaft to an outer end adjacent the wall, a flipper blade beneath the chamber adjacent the inner end of the conveyor adapted to drive material upwardly into the chamber; impeller blade means in the chamber fixed on the shaft to rotate about its upright axis and to drive material outwardly through the side discharge opening; a blower assembly including a blower housing formed about a horizontal axis and having an annular outer surface and opposite upright side walls with an inner of the side walls being disposed alongside the chamber and having a material receiving inlet beneath the aforesaid axis and normally in registry with the material discharge outlet, the blower assembly further having a material discharge chute for guiding material from the housing through the side opening of the silo wall, and horizontal blade means carried on the housing to rotate about the axis; vertical track and guide means supporting the inner side wall on the chamber for vertical movement relative thereto and including limiting means preventing gravitation of the blower housing beyond a disposition placing the inlet in registry with the side discharge opening; and drive means for rotating the shaft and horizontal blade means.

5. A silo unloader for use in a silo having an upright silo wall with a side opening therein comprising: a downwardly opening impeller chamber with a side discharge opening; a vertically disposed drive shaft extending through the chamber with a lower end beneath the chamber; a sweep conveyor drivingly connected to the lower end of the shaft and extending from an inner end adjacent the shaft to an outer end adjacent the wall; impeller blade means adapted to receive material from the inner end and to drive material outwardly through the side discharge opening, the impeller blade means being operatively connected to the shaft to rotate therewith; a blower assembly including a blower housing formed about a horizontal axis and having an annular outer surface and opposite upright side walls with an inner of the side walls being disposed adjacent the chamber and having a material receiving inlet beneath the aforesaid axis and normally in registry with the material discharge outlet, the blower assembly further having a material discharge chute for guiding material from the housing through the side opening of the silo wall, and horizontal blade means carried on the housing to rotate about the axis; track and guide means supporting the inner side wall on the chamber for movement relative thereto and including limiting means preventing gravitation of the blower housing beyond a disposition placing the inlet in registry with the side discharge opening; and drive means for rotating the shaft and horizontal blade means.

6. A silo unloader for use in a silo having an upright silo wall with a side opening therein comprising: a downwardly opening impeller chamber with a side discharge opening; a vertically disposed drive shaft extending through the chamber with a lower end beneath the chamber; a sweep conveyor drivingly connected to the lower end of the shaft and extending from an inner end adjacent the shaft to an outer end adjacent the wall; impeller blade means adapted to receive material from the inner end and to drive material outwardly through the side discharge opening, the impeller blade means being operatively connected to the shaft to rotate therewith; a blower assembly including a blower housing with a wall disposed adjacent the chamber having a material receiving inlet normally in registry with the material discharge outlet, the blower assembly further having a material discharge chute for guiding material from the housing through the side opening of the silo wall, and rotatable blade means carried on the housing; track and guide means supporting the inner side wall on the chamber for movement relative thereto and in a disposition placing the inlet in registry with the side discharge opening; and drive means for rotating the shaft and horizontal blade means.

7. A silo unloader for use in a silo having an upright silo wall with a side opening therein comprising: a downwardly opening impeller chamber with a side discharge opening; a vertically disposed drive shaft extending through the chamber with a lower end beneath the chamber; a sweep auger drivingly connected to the lower end of the shaft and extending from an inner end adjacent the shaft to an outer end adjacent the wall a flipper blade adjacent the inner end of the conveyor adapted to drive material on the inner end of the conveyor upwardly; a downwardly opening panel structure including an overlying panel and opposite side panel above and on opposite sides of the auger, the side panels having lower edges in relatively close relation to the silage surface, the overlying panel being open under the chamber to permit passage of material into the chamber; the panels further having air openings therein closely adjacent the chamber; impeller blade means in the chamber fixed on the shaft to rotate about its upright axis and to drive material outwardly through the side discharge opening; a blower assembly including a blower housing formed about a horizontal axis and having an annular outer wall with a blower discharge therein and opposite upright side walls with an inner of the side walls being disposed alongside the chamber and having a material receiving inlet beneath the aforesaid axis and in registry with the material discharge outlet, the housing being substantially closed except for the inlet and discharge outlet, the blower assembly further having a material discharge chute for guiding material from the housing through the side opening of the silo wall, and horizontal blade means carried on the housing to rotate about the axis; and drive means for rotating the shaft and horizontal blade means.

8. A silo unloader for use in a silo having an upright silo wall with a side opening therein comprising: a downwardly opening impeller chamber with a side discharge opening; a vertically disposed drive shaft extending through the chamber with a lower end beneath the chamber; a sweep auger means drivingly connected to the lower end of the shaft and extending from an inner end adjacent the shaft to an outer end adjacent the wall a flipper blade adjacent the inner end of the conveyor adapted to drive material on the inner end of the conveyor upwardly; a downwardly opening panel structure including an overlying panel extending under the chamber and opposite side panel above and on opposite sides of the auger means, the side panels having lower edges in relatively close relation to the silage surface, the overlying panel being open under the chamber and above the flipper to permit passage of material into the chamber; the panels further having air openings therein closely adjacent the chamber; a blower assembly including a blower housing formed about a horizontal axis and having an annular outer wall with a blower discharge therein and opposite upright side walls with an inner of the side walls being disposed alongside the chamber and having a material receiving inlet beneath the aforesaid axis and in registry with the material discharge outlet, the housing being substantially closed except for the inlet and discharge outlet, the blower assembly further having a material discharge chute for guiding material from the housing through the side opening of the silo wall, and horizontal blade means carried on the housing to rotate about the axis; and drive means for rotating the shaft and horizontal blade means.

9. A silo unloader for use in a silo having an upright silo wall with a side opening therein comprising: a downwardly opening impeller chamber with a side discharge opening; a vertically disposed drive shaft extending through the chamber with a lower end beneath the chamber; a sweep auger means drivingly connected to the lower end of the shaft and extending from an inner end adjacent the shaft to an outer end adjacent the wall a flipper blade adjacent the inner end of the conveyor adapted to drive material on the inner end of the conveyor upwardly; a blower assembly including a blower housing formed about a horizontal axis and having an annular outer wall with a blower discharge therein and opposite upright side walls with an inner of the side walls being disposed alongside the chamber and having a material receiving inlet beneath the aforesaid axis and in registry with the material discharge outlet, the housing being substantially closed except for the inlet and discharge outlet, the blower assembly further having a material discharge chute for guiding material from the housing through the side opening of the silo wall, and horizontal blade means carried on the housing to rotate about the axis; and drive means for rotating the shaft and horizontal blade means.

References Cited by the Examiner
UNITED STATES PATENTS

| | | | |
|---|---|---|---|
| 2,876,043 | 3/1959 | Van Dusen et al. | 302—56 |
| 3,144,144 | 8/1964 | Sime | 214—17.84 |

EVON C. BLUNK, *Primary Examiner.*

ANDRES H. NIELSEN, *Assistant Examiner.*